United States Patent
Keesy et al.

(10) Patent No.: US 8,957,987 B2
(45) Date of Patent: Feb. 17, 2015

(54) STILL IMAGE SOUND ANNOTATION SYSTEM

(71) Applicant: Integrenz LLC, Fort Collins, CO (US)

(72) Inventors: Robert J. Keesy, Niwot, CO (US); Gordon R. Nuttall, Fort Collins, CO (US)

(73) Assignee: Integrenz LLC, Fort Collins, CO (US)

( * ) Notice: Subject to any disclaimer, the term of this patent is extended or adjusted under 35 U.S.C. 154(b) by 3 days.

(21) Appl. No.: 13/936,031

(22) Filed: Jul. 5, 2013

(65) Prior Publication Data

US 2014/0009640 A1    Jan. 9, 2014

Related U.S. Application Data

(60) Provisional application No. 61/668,886, filed on Jul. 6, 2012.

(51) Int. Cl.
| | |
|---|---|
| *H04N 5/76* | (2006.01) |
| *H04N 5/765* | (2006.01) |
| *H04N 5/91* | (2006.01) |
| *H04N 9/806* | (2006.01) |
| *H04N 9/82* | (2006.01) |

(52) U.S. Cl.
CPC ............ *H04N 5/765* (2013.01); *H04N 5/91* (2013.01); *H04N 9/8063* (2013.01); *H04N 9/8205* (2013.01)

USPC .............. 348/231.4; 348/231.5; 348/231.9

(58) Field of Classification Search
USPC ................. 348/231.4, 231.5, 231.9
See application file for complete search history.

(56) References Cited

U.S. PATENT DOCUMENTS

| | | | | |
|---|---|---|---|---|
| 5,739,850 A * | 4/1998 | Hori | ............... | 348/231.99 |
| 6,104,430 A * | 8/2000 | Fukuoka | ............ | 348/231.6 |
| 6,683,649 B1 * | 1/2004 | Anderson | ........... | 348/333.05 |
| 7,053,938 B1 * | 5/2006 | Sherry | ............. | 348/231.4 |
| 7,656,440 B2 * | 2/2010 | Watanabe | ........... | 348/231.9 |
| 7,683,943 B2 * | 3/2010 | Ogawa et al. | ........ | 348/231.6 |
| 2001/0017664 A1 * | 8/2001 | Misawa | ............ | 348/373 |
| 2002/0030750 A1 * | 3/2002 | Mizutani | ........... | 348/222 |
| 2005/0085263 A1 * | 4/2005 | Kim et al. | .......... | 455/556.1 |
| 2011/0039598 A1 * | 2/2011 | Tang et al. | ......... | 455/556.1 |

OTHER PUBLICATIONS

U.S. Appl. No. 61/668,886, filed Jul. 6, 2012.
U.S. Appl. No. 12/925,802, filed Oct. 29, 2010.

* cited by examiner

*Primary Examiner* — Jason Flohre

(57) ABSTRACT

An image sound annotation system including an image capture device having an input-output port which receives a secure digital memory card including an image audio annotation program which can be used with an audio capture device to store an image file in association with a audio file in a memory element for subsequent retrieval and display of an image associated with the image file with concurrent playback of the sound associated with the audio file.

16 Claims, 7 Drawing Sheets

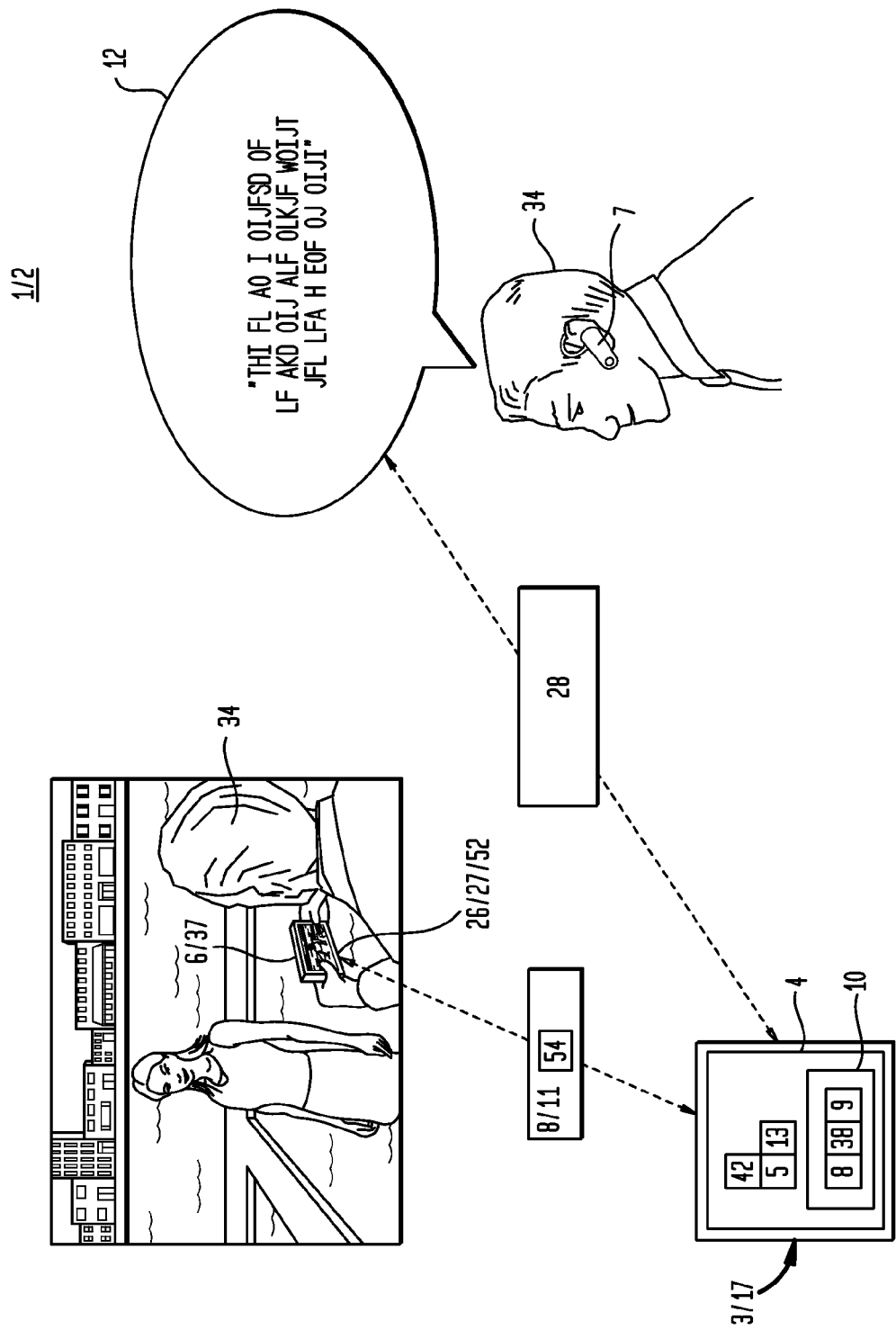

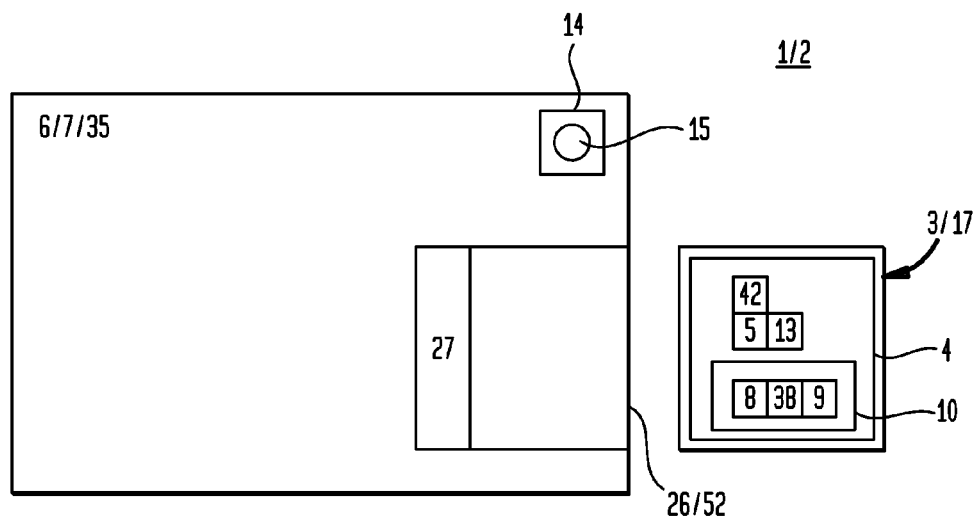
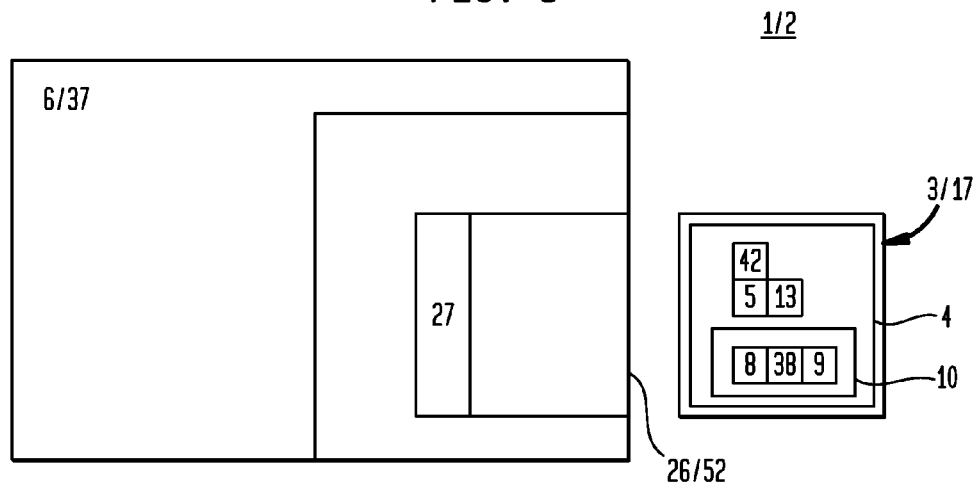

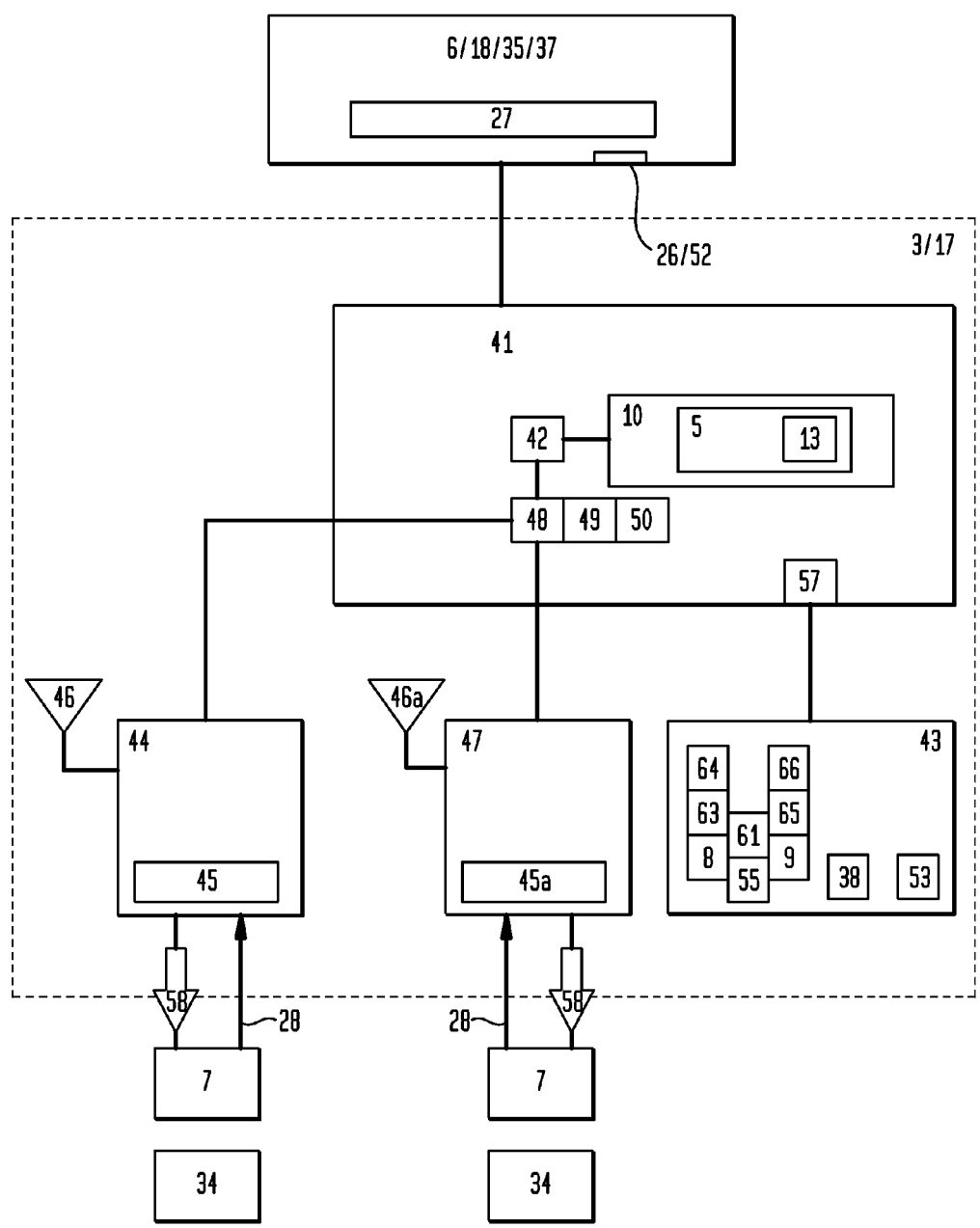

STILL IMAGE SOUND ANNOTATION SYSTEM

This United States Non-Provisional Patent Application claims the benefit of U.S. Provisional Patent Application No. 61/668,886, filed Jul. 6, 2012, hereby incorporated by reference herein.

I. BACKGROUND

An image sound annotation system including an image capture device having an input-output port which receives a secure digital memory card including an image audio annotation program which can be used with an audio capture device to store an image file in association with a audio file in a memory element for subsequent retrieval and display of an image associated with the image file with concurrent playback of the sound associated with the audio file.

Conventional document scanners do not have sound recording capability. The user must initially scan documents such as photographs and save the resulting images as discrete image files. Subsequently, additional steps by the user are required to edit the image files or to prepare a slide show with discrete image editing software. Additional steps by the user must then be taken to overlay sound (music, sound effects, or voice-over) for association with the image for presentation. Typically because the steps in the conventional process are disjoint and spread over a substantial period of time, the persons, devices, or environments having knowledge of or associated with the photographs or documents scanned will not be available to provide oral descriptions or the contemporaneous background sounds or environmental cues relating to the images.

Accordingly, there is a long felt need for a scanner which allows a user to scan a document to obtain an image file and contemporaneous capture sound as an associated audio file which can be stored in a memory element and which allows retrieval for display of the image associated with the image file and concurrent playback of the sound associated with the audio file.

Conventional cameras append captured images with date and time stamps or geotags to provide date, time geographic coordinate location information relating to the image; however, conventional cameras may not have sound recording capability to associate the image date and image location with the experience of the photographer taking the image.

Conventional video capture devices in video operation mode produce an image of lesser quality than still images produced by scanners or cameras. Additionally, in video mode, large amounts of memory may be required to save both an image file and an audio file.

Additionally, conventional image capture devices are often taken on a trip, the user takes photographs or scans photographs or documents during the trip but does not sort out the images, travel description notes, and memorabilia (items that can be scanned such as tickets, menus, tour brochures, and regional maps) until the user returns home. It may be a problem for the user taking an image whether by scanning or by camera to remember the circumstances occurring during scanning or photographing because there is no sound annotation, which may be used to explain the images. Nor is there a way to enhance the recollection of the experience associated with the image.

There would be a substantial advantage in associating an audio annotation substantially concurrent to capturing the image to provide an oral description, background sounds, environmental cues, or other audio information relating to the image. As illustrative examples, the audio annotation relating to an image might include background sound of steel-drum music from a Caribbean cruise band, birds singing, crowd noise at an athletic event, rushing stream, or laughter over a shared story. The audio annotation can enhance the memory of an experience even more so than conventional voice over.

The instant invention provides an image sound annotation system which provides substantial advantages and overcomes in whole or in part certain of the forgoing disadvantages of conventional image capture and audio capture devices and methods.

II. SUMMARY OF THE INVENTION

Accordingly, a broad object of the invention can be to provide a still image sound annotation system including a computer code executable to associate a still image file obtained using an image capture device with an audio file obtained using an audio capture device and which allows the still image file in association with the audio file to be stored in a memory element which upon retrieval concurrently displays the image associated with the image file and plays back the sound associated with the audio file.

Another substantial object of the invention can be to provide a computer program product (a discrete article of manufacture) including a machine readable medium (such as a secure digital memory card) containing a program code executable to associate a still image file obtained using an image capture device with an audio file obtained using an audio capture device.

Another substantial object of the invention can be to provide a method of associating an audio file obtained using an audio capture device with a still image file obtained using an image capture device, the associated image file and audio file stored in a memory element and subsequently retrieved for concurrent display of the image associated with the image file and playback of the sound associate with the audio file.

Naturally, further objects of the invention are disclosed throughout other areas of the specification, drawings, photographs, and claims.

III. A BRIEF DESCRIPTION OF THE DRAWINGS

FIG. 3 is illustration of a particular method of using an embodiment the inventive image sound annotation system.

FIG. 4 is a block diagram of a particular embodiment of the computer implemented image sound annotation system including a mobile scanner.

FIG. 5 is block diagram of a particular embodiment of the computer implemented image sound annotation system including a digital camera.

FIG. 6 is a block diagram of an article of manufacture configured as a secure digital card which can be hosted in a discrete image captured device and which can receive audio signals from a discrete audio device to implement embodiments of the inventive computer implemented image sound annotation system.

IV. DETAILED DESCRIPTION OF THE PREFERRED EMBODIMENTS

Figure 1:
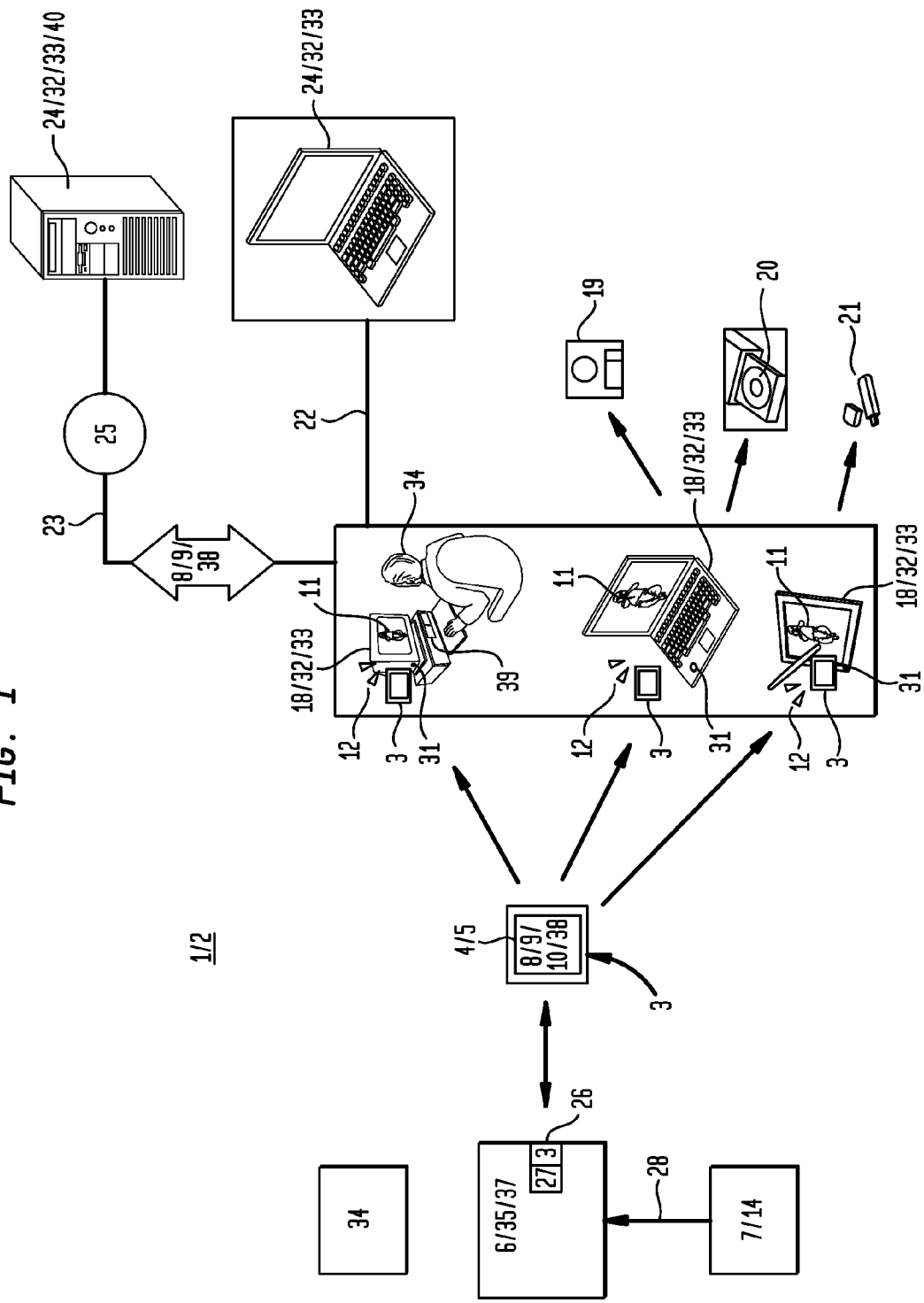
FIG. 1 is an illustration of a particular method of using an embodiment the inventive image sound annotation system.

Generally, a computer-implemented still image sound annotation system (1), method of still image sound annotation (2), and computer program product (3) including a machine readable medium (4) containing a computer program code (5) executable to allow communication with an image capture device (6) and allow communication with an audio capture device (7) and to store a still image file (8) in association with an audio file (9) in a memory element (10) and allow subsequent retrieval and display of an image (11) associated with the still image file (8) and concurrent playback of a sound (12) associated with the audio file (9).

Figure 2:
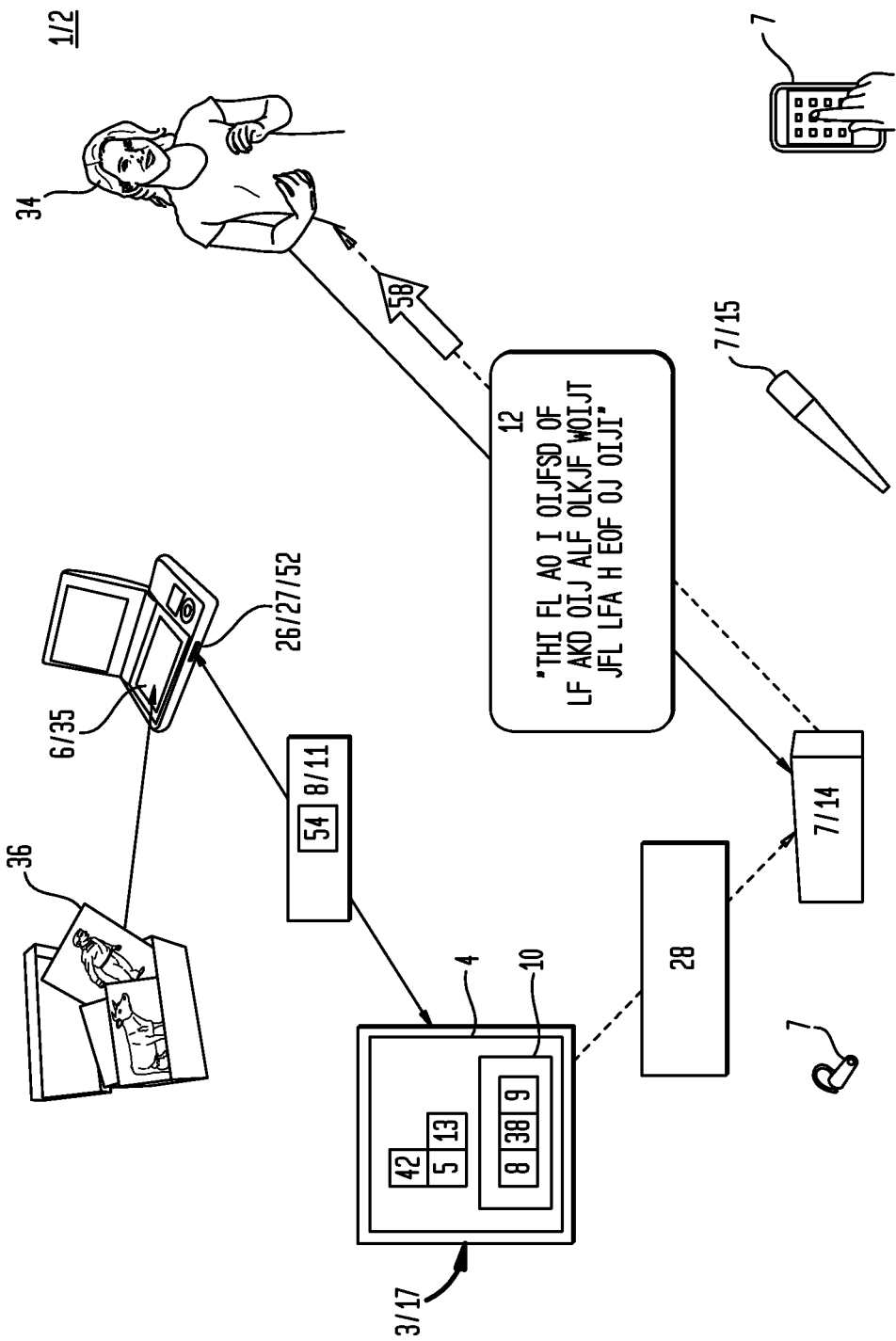
FIG. 2 is illustration of a particular method of using an embodiment the inventive image sound annotation system.

Now referring primarily to FIGS. 1 through 3, which provide a general overview of a particular illustrative embodiment of the still image sound annotation system (1) and an illustrative method of using the still image sound annotation system (2). Particular embodiments of the still image sound annotation system (1) can include an image capture device (6), an audio capture device (7), and a computer program product (3) including a machine readable medium (4) containing a computer program code (5) including in part an image audio annotation program (13).

While the Figures show particular examples of the inventive still image sound annotation system (1), it is not intended that embodiments of the invention be limited to practice with only the exemplary image capture devices (6), audio capture devices (7), or computer program product (3).

The term "image capture device (6)" means for the purposes of this invention any device capable of capturing an image (11) such as a camera, a scanner (and as to particular embodiments the portable scanner described in U.S. patent application Ser. No. 12/925,802, hereby incorporated by reference herein) a video camera, or the like, or combinations thereof.

The term "audio capture device (7)" means for the purposes of this invention any device capable of capturing a sound (12) such audio recorder (14) via a microphone (15) or similar device which may be associated with a headset, desk top speaker, smart telephone, lap top computer, desk top computer, tablet computer, or similar device, or combination thereof, which may or may not be BLUETOOTH enabled in the ISM band from 2400-2480 MHz or may or may not be Wi-Fi enabled in one or more channels in the 2.4 GHz band, or the like, or combinations thereof, for the exchange of data over short distances.

The term "computer program product (3)" means for the purposes of this invention a discrete article of manufacture which includes a machine readable medium (4) containing a computer program code (5) including an image audio annotation program (13) (as further describe herein), and without sacrificing the breadth of the forgoing, embodiments of the computer program product (3) can take the form of a secure digital memory card (17) which can be in original, high capacity, or extended capacity format in any form factor.

The term "machine readable medium (4)" means for the purposes of this invention means any medium capable of non-volatile storage of machine readable code in a format readable by a mechanical device (such as the image capture device (6) or a computer device (18)) and without sacrificing the breadth of the forgoing a magnetic media (19), an optical media (20), a non-volatile memory (21), or the like, or combinations thereof.

Embodiments of the invention can be practiced using a numerous and wide variety of image capture devices (7) and audio capture devices (7) which can be utilized in a local area network ("LAN") (22) or a wide area network ("WAN") (23) where functions or tasks may be performed by one or more remote computer devices (24) that are linked through a communications network such as the Internet (25).

Also while a preferred embodiment of the invention is described in the general context of computer program code (5) such as an application program and program modules which utilize routines, programs, objects, components, data structures, or the like, to perform particular functions or tasks or implement particular abstract data types, or the like, being executed by particular computer means and network means, it is not intended that any embodiments of the invention be limited to a particular computer program code (5) or protocols.

Now referring primarily to FIG. 1, embodiments of the still image annotation system (1) can include an image capture device (6) having an input-output port (26) configured to receive the computer program product (3) including the machine readable medium (4) containing the executable computer program code (5) including the image audio annotation program (13). The image capture device (6) can further include a reader (27) which reads the machine readable media (4) included in the computer program product (3) received in the input-output port (26).

Again referring primarily to FIG. 1, embodiments of the still image annotation system (1) can further include an audio capture device (7) operable to capture a sound (12) and transmit a representation of the sound (12) as an audio signal (28).

The image audio annotation program (13) associated with the computer program product (3) received by the image capture device (6) can be executed to store an image (11) captured by an image capture device (6) as an image file (8) in a memory element (10) and cause the audio signal (28) transmitted by the audio capture device (7) to be transformed to digital audio data (29) for storage as an audio file (9) in the memory element (10). The image audio annotation program (13) can further function to associate the audio file (9) with the image file (8). The image file (8) associated with the audio file (9) can be retrieved by execution of the image audio annotation program (13) to display the image (11) associated with the still image file (8) on an a graphical display surface (30) and concurrently play the sound (12) associated with the audio file (9) through a loud speaker (31). The term "associated" broadly encompasses any manner in which the image file (8) and the audio file (9) can be stored such that retrieval of image file (8) correspondingly retrieves the audio file (9) for concurrent display of the image (11) and play of the sound (12) and without limiting the forgoing includes embedding or linking of the audio file (9) in or to the image file (11).

Embodiments of the still image sound annotation system (1) can further include a computer device (18). The term "computer device (18)" means for the purpose of this invention any device adapted to receive the computer program product (3) or a machine readable medium (4) containing the computer program code (5) including the image audio annotation program (13), or includes a computer processor (32) in communication with a computer memory element (33) containing the computer program (5) including the image audio annotation program (13), or uploads the computer program code (5) including the image audio annotation program (13)

through the WAN (23), such as the Internet (25), or one or more LANs (22) into a computer memory element (33) in communication with the computer processor (32). The computer device (18) can as to particular embodiments take the form of a limited-capability computer designed specifically for receiving the computer program product (3) in the form of a secure digital memory card (17) including a machine readable medium (3) in the form of a memory element (10) containing the computer program code (5) including the image audio annotation program (13); however, other embodiments can take the form of set-top boxes, intelligent televisions connected to receive data through an entertainment medium such as a cable television network or a digital satellite broadcast, hand-held devices such as smart phones, slate or pad computers, personal digital assistants or camera/cell telephones, or multiprocessor systems, microprocessor-based or programmable consumer electronics, network personal computers, minicomputers, mainframe computers, or the like.

Now referring primarily to FIGS. 2 and 4 which provide an illustrative example of using an embodiment of the inventive image sound annotation system (1). A user (34) can operate an image capture device (6) containing a secure digital memory card (17) including the machine readable medium (4) containing the executable computer program code (5) including the image audio annotation program (13). The image capture device (6) can be in the form of a scanner (35) and in particular the portable scanner described in U.S. patent application Ser. No. 12/925,802, to scan one or more documents (36) (such as photographs) and to store an image (11) of the document (36) as an image file (8) (shown as a JPEG in the example FIG. 2) in a memory element (10) of the secure digital memory card (17).

Upon scanning the document (36) the user (34) can utilize, or upon audio prompt (58) (such as one or more beeps) utilize, an audio capture device (7) (such as a headset, microphone (15), smart telephone, or the like) which as to certain embodiments can be BLUETOOTH or Wi-Fi enabled, or similarly enabled, to capture sound (12) such as oral description, background sound, environmental cues, or the like. As above described, the image audio annotation program (13) can cause the corresponding still image file (8) to be associated with an audio file (9) in a memory element (10) and allow subsequent retrieval and display of an image (11) associated with the still image file (8) and concurrent playback of a sound (12) associated with the audio file (9).

Now referring primarily to FIGS. 3 and 5 which provides an illustrative example of using an embodiment of the inventive image sound annotation system (1). A user (34) can operate an image capture device (6) containing a secure digital memory card (17) including the machine readable medium (4) containing the executable computer program code (5) including the image audio annotation program (13). The image capture device (6) can be in the form of a digital camera (37) which captures an image (11) in the form of an image file (8) (shown as a JPEG in the example of FIG. 3) in a memory element (10) of a secure digital memory card (17) inserted into the digital camera (37). Concurrent with taking each image (11), the user (34) can utilize an audio capture device (7) which can be BLUETOOTH or Wi-Fi enabled, or similarly enabled, to capture sound (12) such as oral description, background sound, environmental cues, or other sounds. As above described, the image audio annotation program (13) can cause the corresponding still image file (8) to be associated with an audio file (9) in a memory element (10) (also referred to as audio annotated image files (38)) and allow subsequent retrieval and display of an image (11) associated with the still image file (8) and concurrent playback of a sound (12) associated with the audio file (9).

The image audio annotation program (13) can further function to allow the user (34) to edit the audio annotated images (38) whether in the image file (8) or the audio file (9) to correspondingly alter the displayed image (11) or the played sound (12), or to couple together a plurality of audio annotated images (37) for subsequent serial presentation in the form of slide show, or the like. Editing of the audio annotated images (38) can be accomplished on a computer device (18) discrete from the image capture device (6) by coupling the computer program product (3) containing one more audio annotated images (38) to the computer device and applying the editing features of one or more one or more application programs (39) contained in the computer memory element (33) (as shown in the example of FIG. 1). The image audio annotation program (13) can further function to upload the one or more audio annotated image files (38) to remote memory elements (40) of one or more remote computer devices (24) via local area networks (22) or wide area networks (23) for subsequent retrieval and display of an image (11) associated with the still image file (8) and concurrent playback of a sound (12) associated with the audio file (9).

As to particular embodiments, the computer program product (3) including the machine readable medium (4) containing the computer program code (5) including the image audio annotation program (13) can be coupled to a computer device (18), or the image audio annotation program (13) can be stored in a first memory element (33) communication with the computer processer (32) to execute the image audio annotation program (13) to associate an image file (8) with one or more audio files (9) already stored in the computer memory element (33) or in a remote memory element (40) to generate a corresponding audio annotated image file (38).

Now referring primarily to FIG. 6, as to particular embodiments, the computer program product (3) can be in the form of a secure digital memory card (17) having a non-volatile memory card format for use in image capture devices (6) as above described and in particular cameras (37), scanners (35) and computer devices (18) compatible with the secure digital standard maintained by the SD Card Association. The image capture devices (6) or computer devices (18) can host the secure digital memory cards (17) configured to operate in accordance with embodiments of the invention.

Secure digital memory cards (17) in accordance with the invention can include a first controller (41) (for example a Hyperstone S8 NAND Flash/SD Card Controller) including a processor (42) in communication with a first memory element (10) containing the computer program code (5) including the audio image annotation program (13). The computer program code (5) contained in the first memory element (10) is executable to in part to provide multi-port secure digital control functions and in part to read and write image files (8) associated with the operation of the image capture device (6) to a second memory element (43) (for example a non-volatile memory 2-8 GB NAND Flash).

The computer program product (3) in the form of a secure digital memory card (17) can further include a second controller (44) which can include a transceiver (45) associated with an antenna (46) to receive audio signals (28) from the audio capture device (7). As to particular embodiments the second controller (44) can be a BLUETOOTH controller (for example a Texas Instruments CC2540 BLUETOOTH System-on-Chip) including the associated BLUETOOTH transceiver and BLUETOOTH antenna. As to particular embodiments, the second controller (44) can be a Wi-Fi controller and the associated Wi-Fi receiver and Wi-Fi antenna. As to other embodiments, a second controller (44) and a third controller (47) can provide respectively a BLUETOOTH controller (44) and a Wi-Fi controller (47) including the associated transceivers (45) (45a) and antenna (46) (46a).

The computer program code (5) including the audio image annotation program (13) contained in the first memory element (10) can be executed to cause the second controller (44) or the third controller (47) to place the transceiver (45) in an active condition which allows connection with the audio capture device (7). The computer program code (5) including the audio image annotation program (13) can be further executed to pair the image capture device (6) with the audio capture device (7) upon coupling of a secure digital memory card (17) with the image capture device (6) and reconnect the image capture device (6) with the audio capture device (7) upon each subsequent coupling of a secure digital memory card (17) with the image capture device (6).

The computer program code (5) including the audio image annotation program (13) can cause the audio signal (28) can be compressed and decompress by an audio codec (48) and converted by a digitizer (49) to digital audio data (50). The computer program code (5) including the audio image annotation program (13) can cause the digital audio data (50) to be stored in the second memory element (43) as an audio file (9).

The computer program code (5) including the audio image annotation program (13) can further cause the image file (8) to be associated with the audio file (9) and stored in the second memory (43) and can further cause retrieval of the image file (8) associated with the audio file (9) (or retrieval of the audio annotated image file (38)) and cause display of the image (11) associated with the image file (8) with concurrent play back of the sound (12) associated with the audio file (9) (as shown in the example of FIG. 1).

Figure 7:
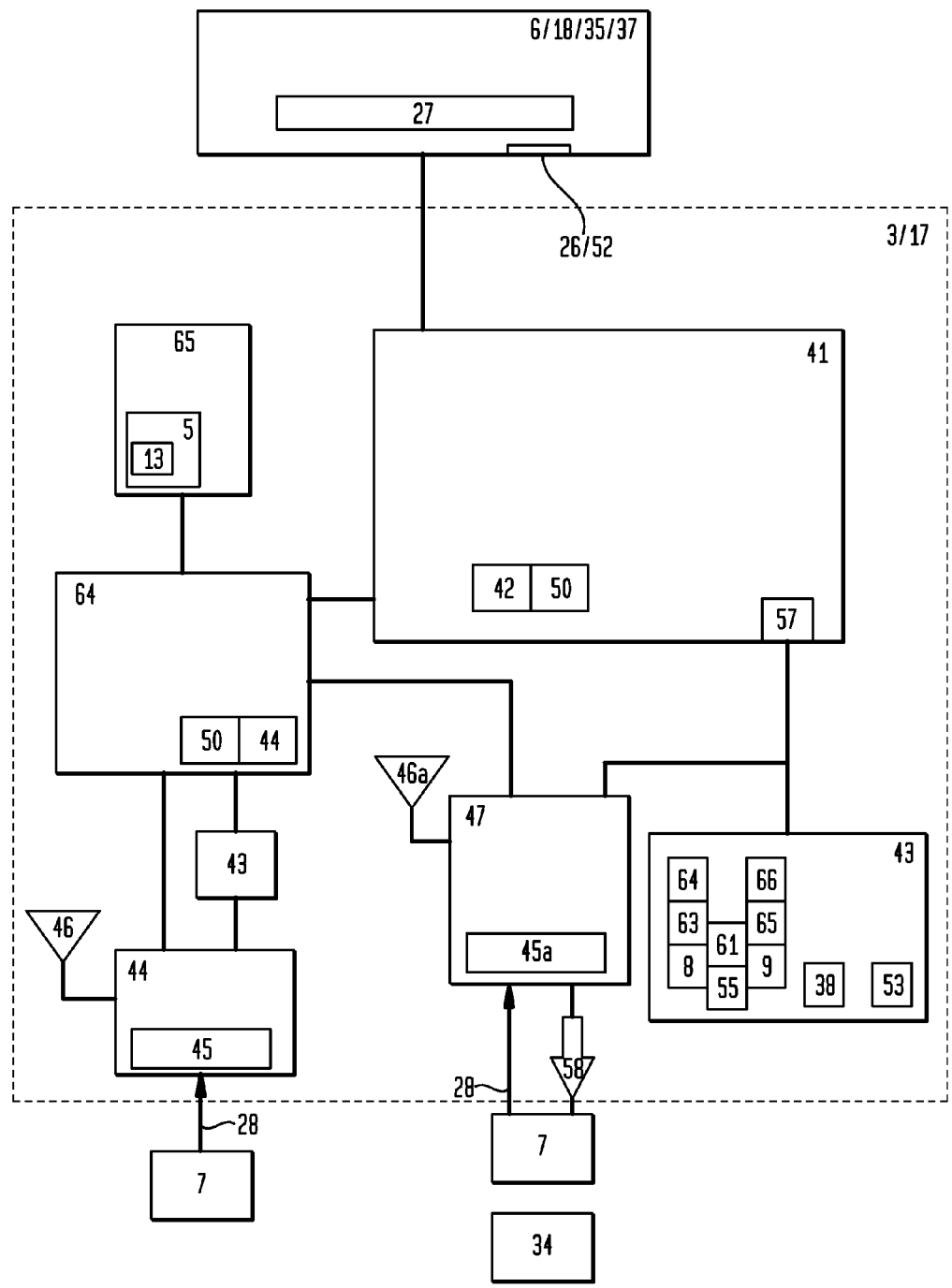
FIG. 7 is a block diagram of an article of manufacture configured as a secure digital card which can be hosted in a discrete image captured device and which can receive audio signals from a discrete audio device to implement embodiments of the inventive computer implemented image sound annotation system.

Now referring primarily to FIG. 7, which illustrates that the computer program product (3) in the form of a secure digital memory card (17) having a non-volatile memory card format for use in image capture devices (6), as above described, can be practiced in various configurations depending upon the efficiencies required by a particular application, each of which can be suitable to implement the inventive still image sound annotation system (1).

A first controller (41) can in part provide multi-port secure digital control functions and in part read and write image files (8) associated with the operation of the image capture device (6) to a second memory element (43).

A second controller (44) which can include a transceiver (45) associated with an antenna (46) to receive audio signals (28) from the audio capture device (7). As to particular embodiments the second controller (44) can be a BLUETOOTH controller including the associated BLUETOOTH transceiver (45) and BLUETOOTH antenna (46).

As to particular embodiments, the second controller (44) can be a Wi-Fi controller and the associated Wi-Fi receiver and Wi-Fi antenna. As to other embodiments, a second controller (44) and a third controller (47) can provide respectively a BLUETOOTH controller (44) and a Wi-Fi controller (47) including the associated transceivers (45) (45a) and antenna (46) (46a).

The audio signal (39) can be compressed and decompress by an audio codec (43) in communication with the second controller (44) (47) and a third controller (64) in communication with the audio codec (43) can include a digitizer (44) to transform the compressed and decompressed audio signal (39) to digital audio data (50).

A third memory element (65) can include the computer program code (5) including the audio image annotation program (13) and the processor (42) in communication with the third controller (64) can execute the computer program code (5) including the audio image annotation program (13) to provide multi-port secure digital control functions and in part to read and write image files (8) associated with the operation of the image capture device (6) to the second memory element (43). The computer program code (5) including the audio image annotation program (13) can cause the digital audio data (50) to be stored in the second memory element (43) as an audio file (9).

The computer program code (5) including the audio image annotation program (13) can further cause the image file (8) to be associated with the audio file (9) and stored in the second memory (43) and can further cause retrieval of the image file (8) associated with the audio file (9) (or retrieval of the audio annotated image file (38)) and cause display of the image (11) associated with the image file (8) with concurrent play back of the sound (12) associated with the audio file (9) (as shown in the example of FIG. 1).

Figure 8:
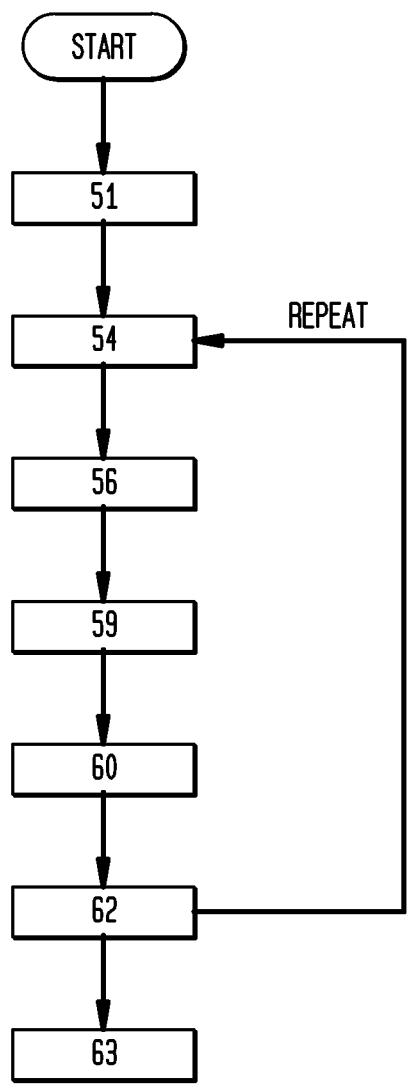
FIG. 8 is a flow block diagram which illustrates a stepwise method of using an image capture device hosting the article of manufacture in the form of a secure digital card and an audio capture device to capture images as image files and capture sounds as audio files which can be associated for concurrent retrievable storage in a memory element.

Now referring primarily to FIG. 8, which provides flow diagram which shows an illustrative stepwise method of using a computer program product (3) including the machine readable medium (4) containing the program code (5) including the image audio annotation program (13) in the form of a secure digital memory card (17), as above described.

In a first step (51), the secure digital memory card (17) can be inserted into a secure digital slot (52) of the image capture device (6) (as shown in the examples of FIGS. 4 and 5). The image capture device (2) can be placed in the active condition by the user (34) or caused by execution of the computer program code (5). The audio capture device (6) can be placed in the active condition by the user (34) such that the audio capture device (6) seeks a connection with the transceiver (45) (45a) of the second controller (46) or third controller (47) of secure digital memory card (17) (as shown in the examples of FIGS. 6 and 7). The image audio annotation program (13) causes the second controller (44) or the third controller (47) or both to seek for an audio capture device (7) within the range of the transceiver (45) (45a). The image audio annotation program (13) can cause pairing with the audio capture device (7) first discovered within the range of the transceiver (45) (45a) of the second controller (44) or third controller (47) of the secure digital memory card (17). The image annotation program (13) can cause storage of reconnection information (53) between the secure digital memory card (17) and the audio capture device (7) for subsequent use of the secure digital memory card (17) in the same image capture device (6).

In a subsequent step (54), the image capture device (6) captures an image (11) (as shown in the examples of FIGS. 2 and 3) and generates an image file (8) in accordance with the file standards defined for that particular image capture device (6) along with an image date and time stamp (54) (as shown in the examples of FIGS. 2 and 3). The image annotation program (13) causes the image file (8) along with the associated image date and time stamp (55) to be stored in the second memory element (43) of the secure digital memory card (17) (as shown in the examples of FIGS. 6 and 7).

In another step (56), the image audio annotation program (13) functions to monitor a secure digital memory card interface bus (57) for writes of an image file (8) to the second memory element (43) (as shown in the examples of FIGS. 6 and 7). As to particular embodiments, the image audio annotation program (13) causes the second controller (44) or the third controller (47) to commence capture of the audio signal (28) from the audio capture device (7). As to other embodiments, the image audio annotation program (13) can cause generation of an audio prompt (58) by the audio capture device (7) for the user (34) (as shown in the examples of FIGS. 2 and 3).

In another step (59), the image audio annotation program (13) causes the audio codec (48) to compress and decompress the audio signal (28) and the digitizer (49) to digitize the audio signal (28) and formatting of the audio file (9) which can be in the same format as the image file (7) generated in step (54) (as shown in the examples of FIGS. 6 and 7).

In another step (60), the image audio annotation program (13) can further function to cause generation of an audio date and time stamp (61) formatted in the same file system as the image date and time stamp (55) for association with the audio file (9) (as shown in the examples of FIGS. 2, 3, 6 and 7).

In another step (62), the audio file (9) along with the associated audio date and time stamp (61) can be transferred to the first controller (44) and stored discrete from the image file (8) in the second memory element (33) (as shown in the examples of FIGS. 6 and 7). An image file directory (63) recorded for the image file (8) may or may not include audio identification information (64) of the associated audio file (9) (as shown in the examples of FIGS. 6 and 7). Similarly, an audio file directory (65) recorded for the audio file (9) may or may not include image identification information (66) of the associated image file (8) (as shown in the examples of FIGS. 6 and 7).

In another step (63), the image audio annotation program (5) functions to associate the image file (8) with the audio file (9) to allow concurrent separate retrieval of the audio annotation file (8) and the image file (9) (as shown in the examples of FIGS. 6 and 7).

As to particular embodiments, the image audio annotation program (5) causes the image file (8) to be linked or embedded with the audio file (9) as an audio annotated image file (38), allowing the image capture device (6) or a computer device (18) to read the associated image file (8) and audio file (9) or audio annotated image file (38) for concurrent display of the image (11) associated with the image file (8) and play back of the sound (12) associated with the audio file (9) (as shown in the examples of FIGS. 1, 6 and 7).

As to particular embodiments the audio file directory (65) recorded for the audio file (9) can include image identification information (66) of the associated image file (8) (as shown in the examples of FIGS. 6 and 7) or the image file directory (63) recorded for the image file (8) can include audio identification information (64) such that retrieval of either the image file (8) or the audio file (9) the other is concurrently retrieved and the image (11) displayed and the sound (12) concurrently played.

As to particular embodiments, the image audio annotation program (5) causes the image date and time stamp (54) of an image file (8) and the audio date and time stamp (61) of the audio file (9) to be associated allowing the image capture device (6) or a computer device (18) to read the associated image file (8) and audio file (9) or audio annotated image file (38) for concurrent display of the image (11) associated with the image file (8) and play back of the sound (12) associated with the audio file (9) (as shown in the examples of FIGS. 1, 6 and 7).

As can be easily understood from the foregoing, the basic concepts of the present invention may be embodied in a variety of ways. The invention involves numerous and varied embodiments of image sound annotation system (1) and methods of using embodiments of the image sound annotation system (1) including the best mode.

As such, the particular embodiments or elements of the invention disclosed by the description or shown in the figures or tables accompanying this application are not intended to be limiting, but rather exemplary of the numerous and varied embodiments generically encompassed by the invention or equivalents encompassed with respect to any particular element thereof. In addition, the specific description of a single embodiment or element of the invention may not explicitly describe all embodiments or elements possible; many alternatives are implicitly disclosed by the description and figures.

It should be understood that each element of an apparatus or each step of a method may be described by an apparatus term or method term. Such terms can be substituted where desired to make explicit the implicitly broad coverage to which this invention is entitled. As but one example, it should be understood that all steps of a method may be disclosed as an action, a means for taking that action, or as an element which causes that action. Similarly, each element of an apparatus may be disclosed as the physical element or the action which that physical element facilitates. As but one example, the disclosure of a "image" should be understood to encompass disclosure of the act of "imaging"—whether explicitly discussed or not—and, conversely, were there effectively disclosure of the act of "imaging", such a disclosure should be understood to encompass disclosure of a "image" and even a "means for door imaging." Such alternative terms for each element or step are to be understood to be explicitly included in the description.

In addition, as to each term used it should be understood that unless its utilization in this application is inconsistent with such interpretation, common dictionary definitions should be understood to be included in the description for each term as contained in the Random House Webster's Unabridged Dictionary, second edition, each definition hereby incorporated by reference.

All numeric values herein are assumed to be modified by the term "about", whether or not explicitly indicated. For the purposes of the present invention, ranges may be expressed as from "about" one particular value to "about" another particular value. When such a range is expressed, another embodiment includes from the one particular value to the other particular value. The recitation of numerical ranges by endpoints includes all the numeric values subsumed within that range. A numerical range of one to five includes for example the numeric values 1, 1.5, 2, 2.75, 3, 3.80, 4, 5, and so forth. It will be further understood that the endpoints of each of the ranges are significant both in relation to the other endpoint, and independently of the other endpoint. When a value is expressed as an approximation by use of the antecedent "about," it will be understood that the particular value forms another embodiment. The term "about" generally refers to a range of numeric values that one of skill in the art would consider equivalent to the recited numeric value or having the same function or result. Similarly, the antecedent "substantially" means largely, but not wholly, the same form, manner or degree and the particular element will have a range of configurations as a person of ordinary skill in the art would consider as having the same function or result. When a particular element is expressed as an approximation by use of the antecedent "substantially," it will be understood that the particular element forms another embodiment.

Moreover, for the purposes of the present invention, the term "a" or "an" entity refers to one or more of that entity unless otherwise limited. As such, the terms "a" or "an", "one or more" and "at least one" can be used interchangeably herein.

Thus, the applicant(s) should be understood to claim at least: i) each of the image sound annotation systems and computer readable media herein disclosed and described, ii) the related methods disclosed and described, iii) similar, equivalent, and even implicit variations of each of these devices and methods, iv) those alternative embodiments which accomplish each of the functions shown, disclosed, or described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) methods and apparatuses substantially as described hereinbefore and with reference to any of the accompanying examples, x) the various combinations and permutations of each of the previous elements disclosed.

The background section of this patent application provides a statement of the field of endeavor to which the invention pertains. This section may also incorporate or contain paraphrasing of certain United States patents, patent applications, publications, or subject matter of the claimed invention useful in relating information, problems, or concerns about the state of technology to which the invention is drawn toward. It is not intended that any United States patent, patent application, publication, statement or other information cited or incorporated herein be interpreted, construed or deemed to be admitted as prior art with respect to the invention.

The claims set forth in this specification, if any, are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent application or continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

Additionally, the claims set forth in this specification, if any, are further intended to describe the metes and bounds of a limited number of the preferred embodiments of the invention and are not to be construed as the broadest embodiment of the invention or a complete listing of embodiments of the invention that may be claimed. The applicant does not waive any right to develop further claims based upon the description set forth above as a part of any continuation, division, or continuation-in-part, or similar application.

We claim:

1. An article of manufacture, comprising:
    a first memory element;
    a processor in communication with said first memory element;
    a second controller including a transceiver;
    a computer readable program code contained in said first memory element executable to:
        store an image captured by an image capture device as a still image file in said first memory element;
        cause said second controller to place said transceiver in an active condition which allows connection with an audio capture device;
        receive an audio signal transmitted by said audio capture device;
        transform said audio signal to digital audio data;
        store said digital audio data as an audio file in said first memory element;
        embed said audio file in said still image file;
        retrieve said audio file embedded in said still image file;
        display an image associated with said still image file; and
        concurrently play a sound associated with said audio file,
    wherein said article of manufacture is shaped to be inserted into a secure digital slot of said image capture device.

2. The article of manufacture of claim 1, wherein said first memory element and said processor comprise a first controller.

3. The article of manufacture of claim 1, wherein said computer readable program code is further executable to:
    pair said audio capture device with said image capture device upon coupling of said article of manufacture with said image capture device; and
    reconnect said article of manufacture with said audio capture device upon each subsequent coupling of said article of manufacture with said image capture device.

4. The article of manufacture of claim 1, wherein said image capture device comprise a digital camera or a scanner.

5. The article of manufacture of claim 4, wherein said audio capture device comprises a wireless audio capture device.

6. The article of manufacture of claim 5, wherein said wireless audio capture device comprises a BLUETOOTH wireless audio capture device or a wireless local area network device.

7. The article of manufacture of claim 1, further comprising:
    a first controller capable of communication with said image capture device, said computer readable program code contained in said first memory element executable to cause said first controller to retrieve said still image file from said image capture device.

8. The article of manufacture of claim 7, further comprising:
    said computer readable program code executable to cause said second controller to connect with said audio capture device.

9. The article of manufacture of claim 8, wherein said computer readable program code is further executable to:
    pair said audio capture device with said image capture device upon communication of said first controller with said image capture device; and
    reconnect said second controller to said audio capture device upon each subsequent communication of said first controller with said image capture device.

10. A computer system for sound annotation of a still image, comprising:
    an audio capture device capable of sending an audio signal;
    image capture device capable of capturing an image;
    an article of manufacture discrete from said audio capture device and said image capture device adapted to couple with said image capture device, said article of manufacture including:
    a memory element;
    a transceiver capable of receiving said audio signal transmitted by said discrete audio capture device;
    a processor in communication with said memory element, said memory element including a computer code executable to:

store an image captured by said discrete image capture device as an image file in said memory element;
transform said audio signal to digital audio data; and
store said digital audio data as an audio file in said memory element;
associate said audio file with said image file;
concurrently retrieve said audio file associated with said image file;
display an image associated with said still image file; and
play a sound associated with said audio file embedded in said image file,
wherein said image capture device has a secure digital slot to receive a secure digital memory card, and wherein said article of manufacture has an external configuration adapted for insertion into said secure digital slot of said image capture device.

11. The computer system of claim 10, wherein said computer code is further executable to:
initially place the transceiver in an active condition which allows connection with said audio capture device; and
pair said audio capture device with said image capture device allowing reconnection of said article of manufacture with said audio capture device upon each subsequent use of said article of manufacture with said image capture device.

12. The computer system of claim 11, wherein said computer code is further executable to:
identify capture of said image by said image capture device; and
transmit an audio prompt to said audio capture device indicating capture of said image by said image capture device.

13. The computer system of claim 12, wherein said article of manufacture has an external configuration of a secure digital memory card.

14. The computer system of claim 13, wherein said image capture device comprises a digital camera or a scanner.

15. The computer system of claim 14, wherein said audio capture device comprises a wireless audio capture device.

16. The computer system of claim 15, wherein said wireless audio capture device comprises a BLUETOOTH wireless audio capture device or a wireless local area network device.

* * * * *